(12) United States Patent
Yamada et al.

(10) Patent No.: US 12,510,375 B2
(45) Date of Patent: Dec. 30, 2025

(54) OPERATION MANAGEMENT APPARATUS

(71) Applicant: HITACHI, LTD., Tokyo (JP)

(72) Inventors: Hiroyuki Yamada, Tokyo (JP); Kazuya Sugimoto, Tokyo (JP); Masaya Itoh, Tokyo (JP)

(73) Assignee: HITACHI, LTD., Tokyo (JP)

( * ) Notice: Subject to any disclaimer, the term of this patent is extended or adjusted under 35 U.S.C. 154(b) by 470 days.

(21) Appl. No.: 18/191,007

(22) Filed: Mar. 28, 2023

(65) Prior Publication Data

US 2023/0386336 A1 Nov. 30, 2023

(30) Foreign Application Priority Data

May 31, 2022 (JP) ................................ 2022-088267

(51) Int. Cl.
*G01C 21/00* (2006.01)
*G08G 1/16* (2006.01)

(52) U.S. Cl.
CPC ....... *G01C 21/383* (2020.08); *G01C 21/3881* (2020.08)

(58) Field of Classification Search
CPC .... G01C 21/383; G01C 21/3881; G08G 1/16; G05D 1/2464
See application file for complete search history.

(56) References Cited

U.S. PATENT DOCUMENTS

| 2019/0176328 A1* | 6/2019 | Kichkaylo | ........... G05D 1/0231 |
| 2022/0119011 A1* | 4/2022 | Li | ................... B60W 60/00276 |
| 2022/0343241 A1* | 10/2022 | Jha | ......................... G08G 1/166 |

FOREIGN PATENT DOCUMENTS

JP 2018-107940 A 7/2018

* cited by examiner

*Primary Examiner* — David P. Merlino
*Assistant Examiner* — Mahmoud M Kazimi
(74) *Attorney, Agent, or Firm* — MATTINGLY & MALUR, PC

(57) ABSTRACT

An operation management apparatus includes: a map converter that performs interconversion between a first individual section state corresponding to a first mobile object and a reference section state and interconversion between a second individual section state corresponding to a second mobile object and the reference section state; and a block control controller that determines the first individual section state and the second individual section state to prevent a collision between the first mobile object and the second mobile object based on conversion results of the map converter.

8 Claims, 12 Drawing Sheets

OPERATION MANAGEMENT APPARATUS

CROSS-REFERENCE TO RELATED APPLICATION

The present application claims priority from Japanese application JP2022-088267, filed on May 31, 2022, the contents of which is hereby incorporated by reference into this application.

BACKGROUND OF THE INVENTION

1. Field of the Invention

The invention relates to an operation management apparatus.

2. Description of the Related Art

In a case where mobile objects as a plurality of autonomous mobile devices are operated in the same area, block control is sometimes performed such that planned operation areas of the respective mobile objects are managed to be blocked in advance in order to avoid a collision between the mobile objects, and other mobile objects do not enter the area. This type of technology is described, for example, in JP 2018-107940 A below.

SUMMARY OF THE INVENTION

Meanwhile, the above-described technology relates to a railway vehicle, and sizes of the vehicles handled in the block control are substantially the same. However, there is a case where a plurality of types of autonomous mobile devices having different sizes are used in a mixed manner in a warehouse or the like. JP 2018-107940 A does not particularly describe this type of application.

The invention has been made in view of the above-described circumstances, and an object thereof is to provide an operation management apparatus capable of appropriately controlling a plurality of types of mobile objects.

In order to solve the above problem, an operation management apparatus of the invention includes: a map converter configured to perform interconversion between a first individual section state and a reference section state and interconversion between a second individual section state and the reference section state with respect to a map database including a first individual block section map, a second individual block section map, and a reference block section map, the first individual block section map storing the first individual section state that is either "blocked" indicating occupancy by or "non-blocked" indicating non-occupancy by a first mobile object or a second mobile object for each of first block sections having a first section size corresponding to the first mobile object, the second individual block section map storing the second individual section state that is either "blocked" indicating occupancy by or "non-blocked" indicating non-occupancy by the first or second mobile object for each of second block sections corresponding to the second mobile object and having a second section size different from the first section size, and the reference block section map storing the reference section state that is either "blocked" indicating occupancy by or "non-blocked" indicating non-occupancy by the first or second mobile object for each of reference block sections having a reference section size in which both the first and second individual block section maps can be represented; and a blocking control controller configured to determine the first individual section state and the second individual section state based on conversion results of the map converter to prevent a collision between the first mobile object and the second mobile object.

According to the invention, the plurality of types of mobile objects can be appropriately controlled.

DESCRIPTION OF THE PREFERRED EMBODIMENTS

Overview of Embodiments

It is considered that it is possible to perform block control to prevent collision between vehicles by preventing entry of other vehicles into a block section using a fixed block section fixedly set on travel routes of a plurality of vehicles when the content of JP 2018-107940 A described above is applied. On the other hand, sizes of the vehicles handled by the block control are substantially the same. For example, in a case where a plurality of types of autonomous mobile devices having different sizes are mixed in the same area in a warehouse or the like, it is preferable to set block sections corresponding to the different sizes of autonomous mobile devices. Here, in a case where a plurality of different types of block section maps, it is necessary to manage overlapping relations between the mutual block section maps. However, for example, preparing a correspondence table for managing the overlapping relations of the block section maps in all combinations is likely to increase production costs at the time of adding a new autonomous mobile device and reduce the extensibility of an operation management apparatus that performs the block control.

Further, it is also conceivable to perform block control of a plurality of different types of autonomous mobile devices using one block section map in which a size of a block section is reduced. In such a case, however, a processing load of the block control is also likely to increase as the number of block sections increases. Therefore, in embodiments to be described later, the processing load is suppressed by using a plurality of individual block section maps that use different section sizes and a common reference block section map that uses a section size capable of representing the plurality of individual block section maps.

Hereinafter, the embodiments will be described with reference to the drawings. The following descriptions illustrate specific examples of the content of the invention. The invention is not limited to these descriptions, and various changes and modifications by those skilled in the art can be made within the scope of the technical idea disclosed in the present specification. Further, the same reference signs will be attached to those having the same function in the entire drawing for describing the embodiments, and the repetitive description thereof will be omitted in some cases.

First Embodiment

Configuration of First Embodiment

Figure 1:
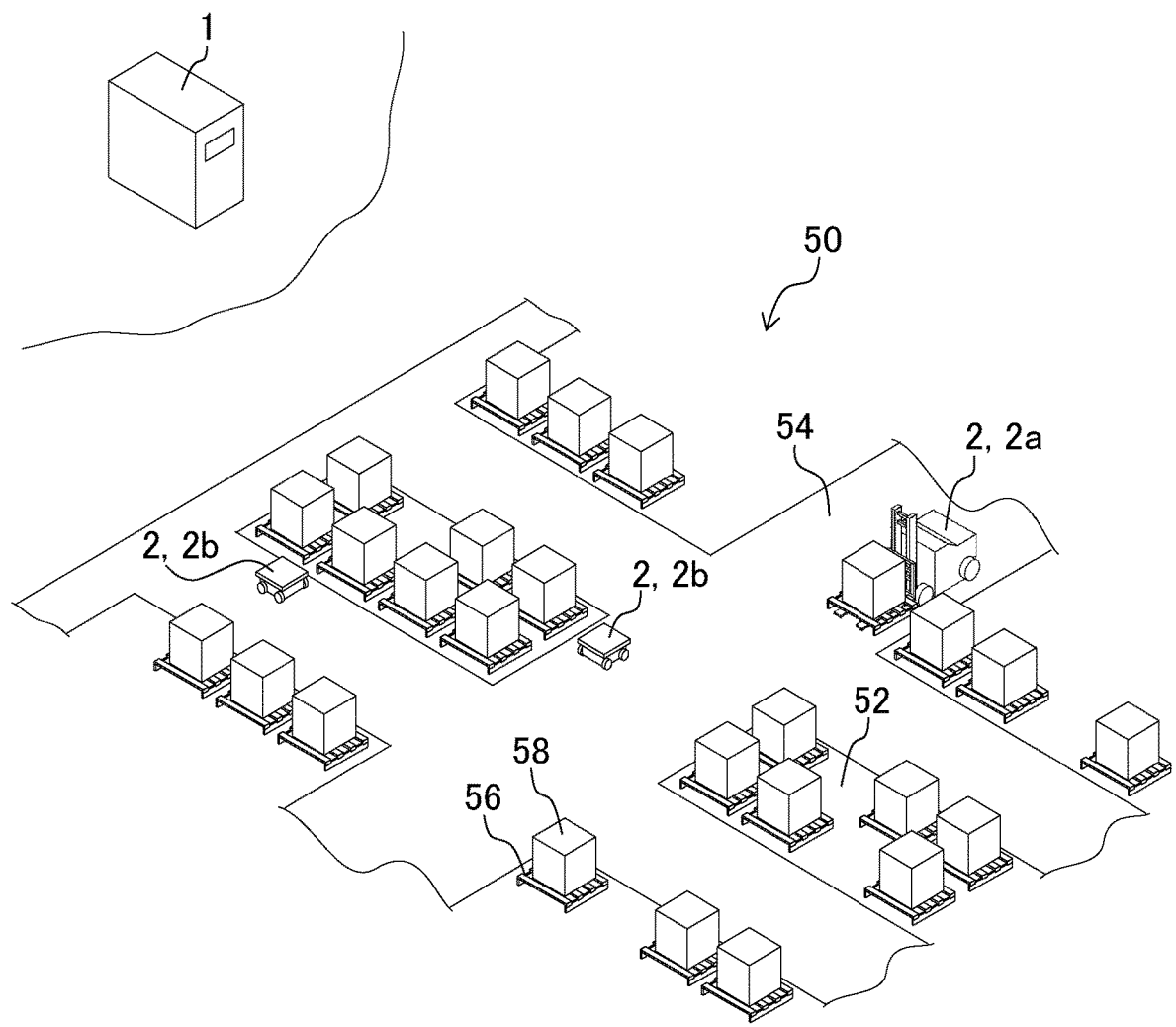
FIG. 1 is a schematic perspective view of a distribution warehouse.

FIG. 1 is a schematic perspective view of a distribution warehouse 50. The distribution warehouse 50 is an example of a use environment of an operation management apparatus 1 according to a first embodiment.

The operation management apparatus 1 is used in an environment in which autonomous mobile devices 2 that are autonomously movable operate. In the present embodiment, an unmanned forklift 2a (first mobile object) and an autonomous mobile robot (AMR) 2b (second mobile object), which are the autonomous mobile devices 2, simultaneously perform work in the same space in the distribution warehouse 50. The distribution warehouse 50 includes a passage 54 which is a region secured in a substantially lattice shape, and storage areas 52 which are rectangular regions inside the respective lattices. Pallets 56 are arranged in the storage area 52, and cargoes 58 such as cardboard boxes are placed on the pallets 56, respectively.

Figure 2:
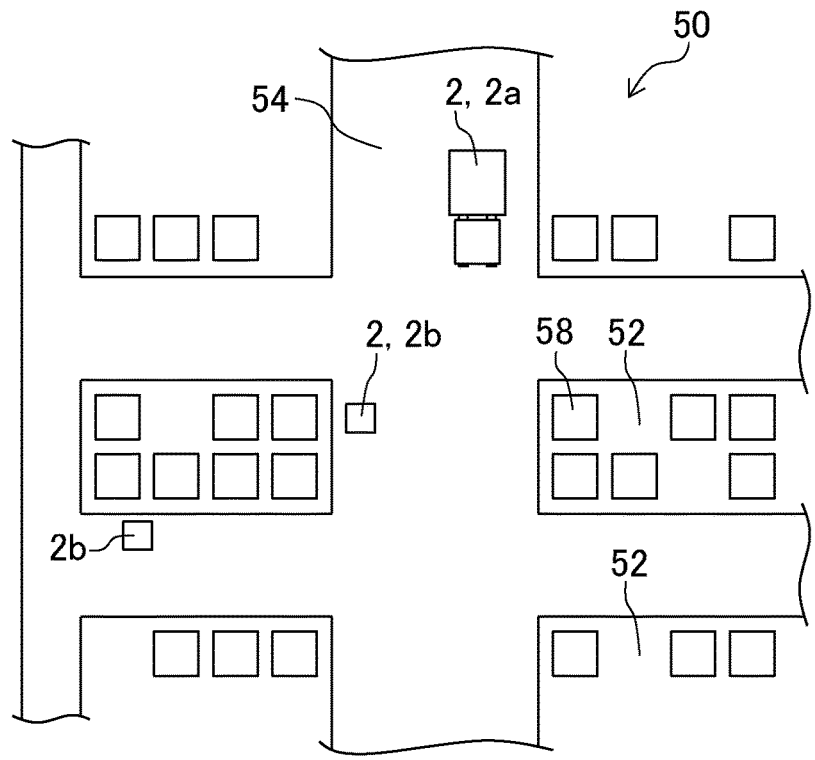
FIG. 2 is a schematic plan view of the distribution warehouse.

FIG. 2 is a schematic plan view of the distribution warehouse 50. Note that the pallets 56 is not illustrated in FIG. 2.

Figure 3:
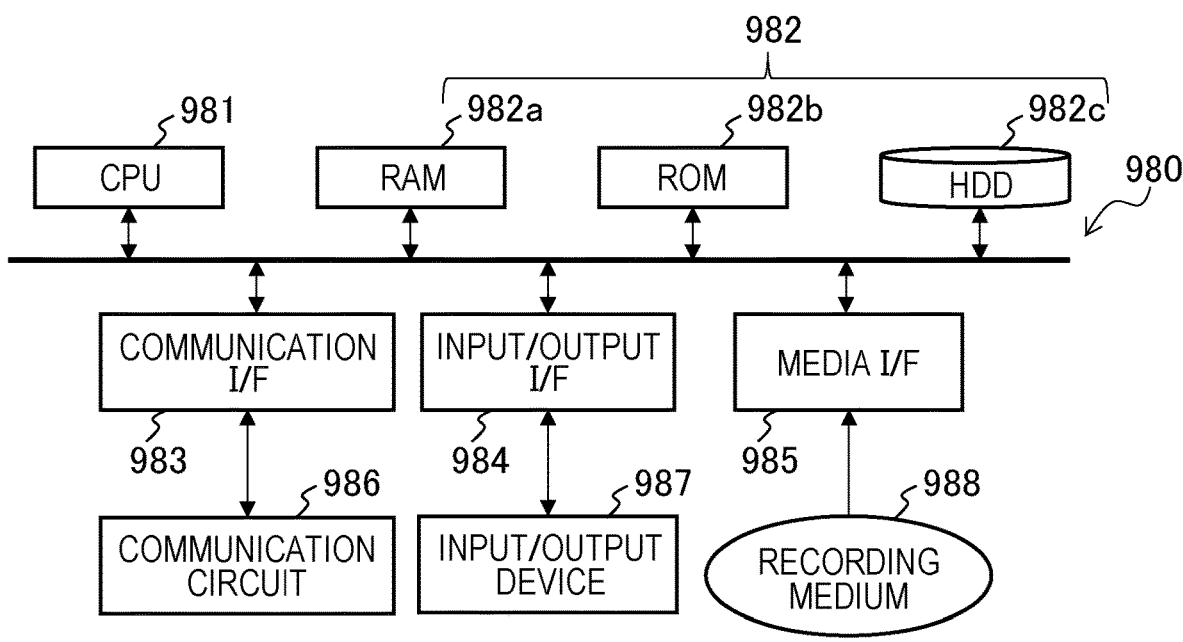
FIG. 3 is a block diagram of a computer.

FIG. 3 is a block diagram of a computer 980. The operation management apparatus 1 illustrated in FIG. 1 includes one or a plurality of the computers 980 illustrated in FIG. 3.

In FIG. 3, the computer 980 includes a CPU 981, a storage unit 982, a communication interface (I/F) 983, an input/output I/F 984, and a media I/F 985. Here, the storage unit 982 includes a RAM 982a, a ROM 982b, and an HDD 982c.

The communication I/F 983 is connected to a communication circuit 986. The input/output I/F 984 is connected to an input/output device 987. The media I/F 985 reads and writes data from and in a recording medium 988. The ROM 982b stores an initial program loader (IPL) and the like to be executed by the CPU. The HDD 982c stores a control program, various types of data, and the like. The CPU 981 executes the control program and the like read from the HDD 982c into the RAM 982a to implement various functions.

Figure 4:
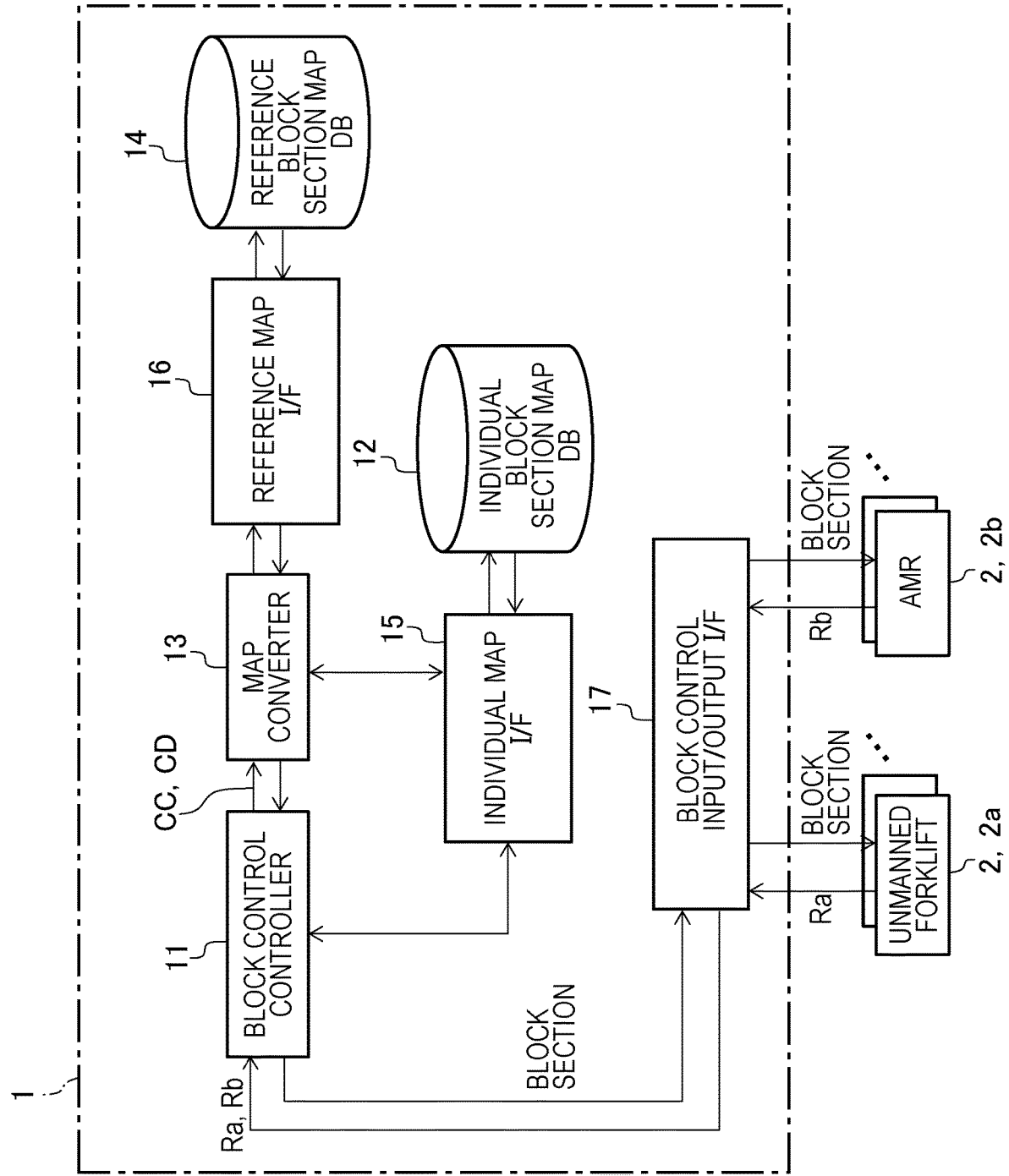
FIG. 4 is a block diagram illustrating functions and the like of an operation management apparatus.

FIG. 4 is a block diagram illustrating functions and the like of the operation management apparatus 1. In FIG. 4, each block in the operation management apparatus 1 indicates the function implemented by the control program and the like. That is, the operation management apparatus 1 includes a block control controller 11, an individual block section map DB12 (map database), a map converter 13, a reference block section map DB14 (map database), an individual map I/F 15 (database interface unit), a reference map I/F 16 (database interface unit), and a block control input/output I/F 17 (block control input/output interface).

The block control controller 11 inputs and outputs block requests Ra and Rb and a block section to and from the autonomous mobile device 2 via the block control input/output I/F 17. Here, the autonomous mobile device 2 is one or a plurality of the unmanned forklifts 2a, one or a plurality of the AMRs 2b, or a combination thereof.

As a result, the operation management apparatus 1 performs block control on the autonomous mobile device 2. Here, the "block control" is control to allocate sections (block sections) in the passage 54 to the respective autonomous mobile devices 2 to be occupied. At this time, the block sections are allocated so as not to overlap each other, for example, in order to prevent a collision between the autonomous mobile devices 2. A state of each of the block sections is referred to as a "section state". When the block section is assigned to any of the autonomous mobile devices 2, the section state has the same value as a mobile object ID of the autonomous mobile device 2. Further, in a case where the block section is not allocated to any of the autonomous mobile devices 2, "0" (non-blocked) is set.

Each of the autonomous mobile devices 2 is connected to the operation management apparatus 1 by wireless communication. The autonomous mobile device 2 transmits a block request to the operation management apparatus 1. That is, the unmanned forklift 2a transmits the block request Ra (first block request), and the AMR 2b transmits the block request Rb (second block request). Each of the block requests Ra and Rb includes a travel node ID and a mobile object ID which are necessary for the block control.

Here, the travel node IDs are identification numbers assigned to travel nodes (details will be described later) serving as a start point, an end point, and a relay point of a travel route. The mobile object ID is an identification number for uniquely identifying the autonomous mobile device 2. When receiving the block requests Ra and Rb, the operation management apparatus 1 determines whether or not a block section corresponding to a travel node ID included in the block requests Ra and Rb can be blocked (can be allocated) to the autonomous mobile device 2 as a transmission source.

Then, when the blocking is possible, the operation management apparatus 1 blocks the block section with respect to the autonomous mobile device 2 as the transmission source, and returns the allocated block section to the autonomous mobile device 2 as the transmission source. As a result, the block control controller 11 performs the block control on the plurality of autonomous mobile devices 2. The autonomous mobile device 2 moves while controlling its own device position so as not to deviate from the block section based on the block section designated by the block control controller 11. As a result, the collision between the autonomous mobile devices 2 can be prevented.

Figure 5:
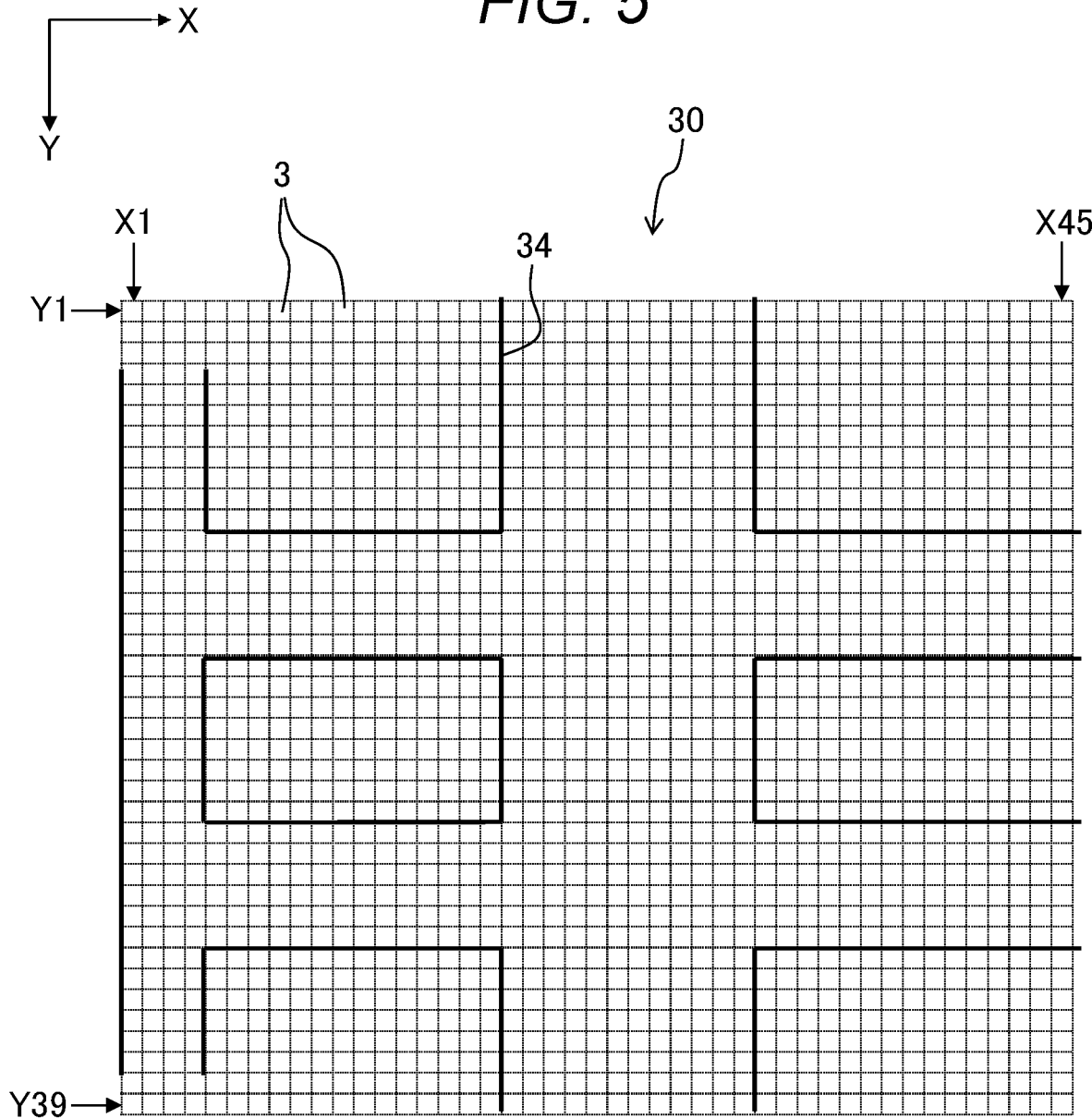
FIG. 5 is a view illustrating an example of a reference block section map.
Figure 6:
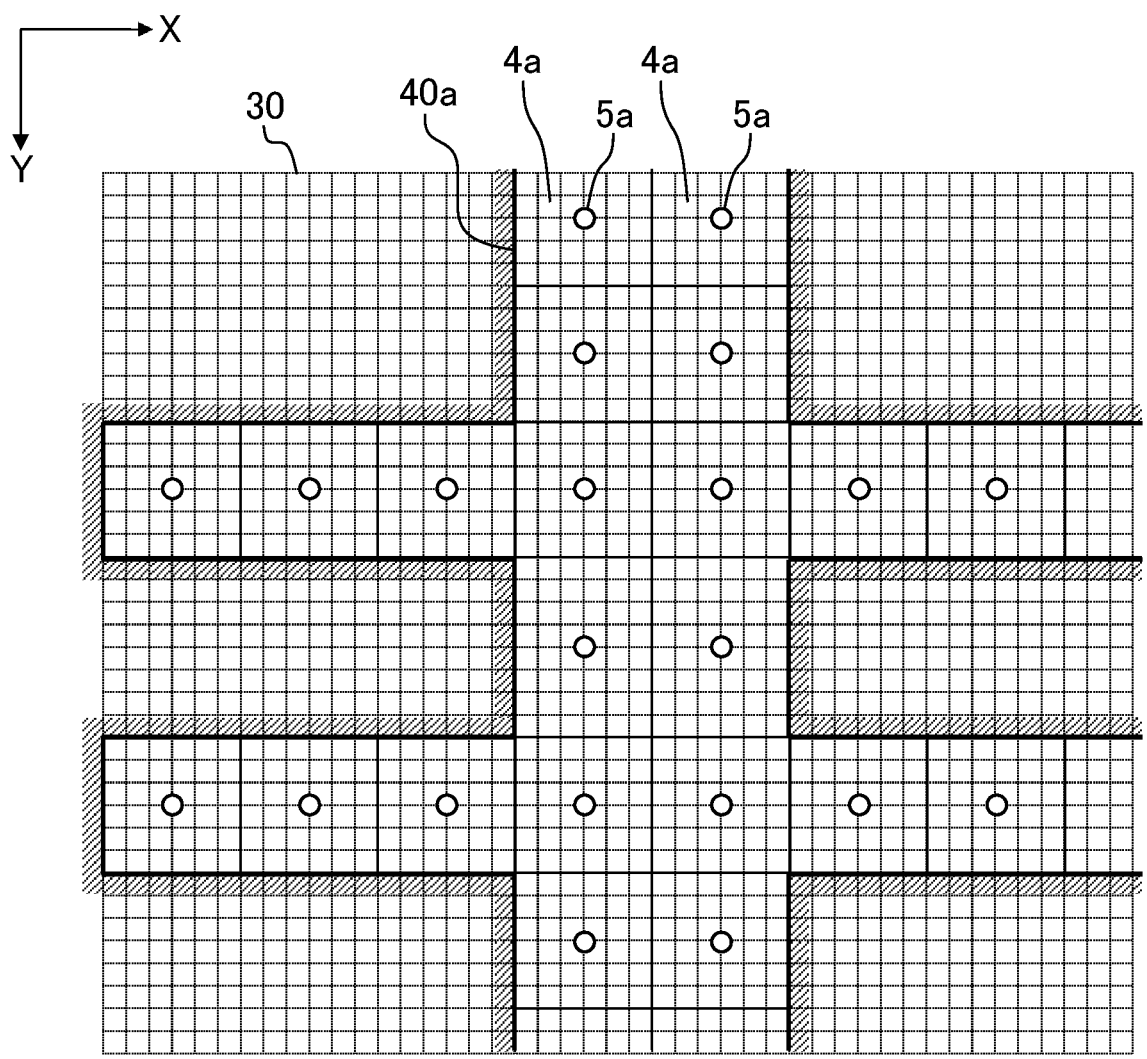
FIG. 6 is a view illustrating an example of an individual block section map for an unmanned forklift.
Figure 7:
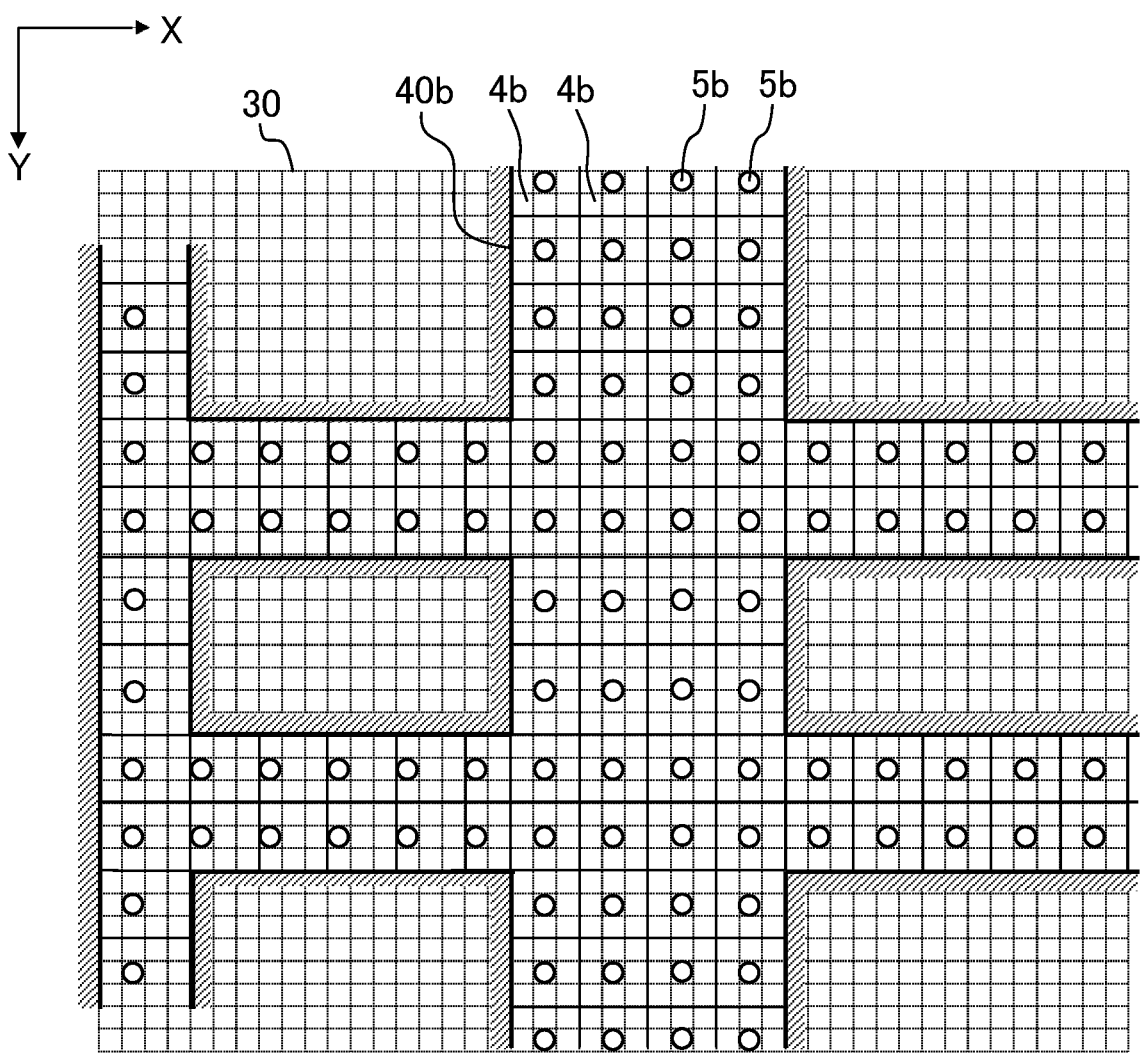
FIG. 7 is a view illustrating an example of an individual block section map for an AMR.

The individual block section map DB12 stores a plurality of types of individual block section maps, for example, individual block section maps 40a and 40b (see FIGS. 6 and 7). Here, the individual block section maps 40a and 40b are respectively maps of block sections corresponding to types of the autonomous mobile devices 2 (the unmanned forklift 2a and the AMR 2b in the above-described example). A size of one section in the individual block section maps 40a and 40b may be set to a size sufficient for the block control of the corresponding autonomous mobile device 2. Further, the reference block section map DB14 stores a reference block section map 30 (see FIG. 5). Here, the reference block section map 30 is a map that can correspond to the types of all the autonomous mobile devices 2. One section in the reference block section map 30 has a smaller size than the section of the individual block section maps 40a and 40b.

The map converter 13 interconverts a whole or a part of the individual block section map and the reference block section map. More specifically, the map converter 13 inputs and outputs the individual block section map to and from the individual block section map DB12 via the individual map I/F 15. Further, the map converter 13 inputs and outputs the reference block section map to and from the reference block section map DB14 via the reference map I/F 16.

FIG. 5 is a view illustrating an example of the reference block section map 30 stored in the reference block section map DB14.

The reference block section map 30 is obtained by dividing a two-dimensional plane corresponding to the plan view of the distribution warehouse 50 illustrated in FIG. 2 by reference block sections 3 having constant sizes (referred to as reference section sizes Sc). In the illustrated example, the number of the reference block sections 3 is "45×39". In the illustrated example, a shape of the reference block section 3 is square, but may be rectangular or other quadrilaterals. However, the reference section sizes Sc are preferably uniform. A unique block section ID is assigned to each of the reference block sections 3 of the reference block section map 30.

In the following description, the two-dimensionally divided reference block sections 3 are identified using X-axis and Y-axis coordinates. For example, the reference block section 3 at the upper left on the page is represented by "X1Y1", and the reference block section 3 at the lower right is represented by "X45Y39". Although not illustrated, the reference block section map 30 also includes information such as a position, a size, and a section state of each of the reference block sections 3. The section state (the mobile object ID of the blocked autonomous mobile device 2 when blocking is performed, and "0" when blocking is not performed) in the reference block section map 30 is hereinafter referred to as a "reference section state Dc". Further, a boundary line 34 indicated by a thick solid line in the drawings is a line corresponding to a boundary between the storage area 52 and the passage 54 in the distribution warehouse 50 (see FIG. 1). However, the boundary line 34 is described for reference, and the reference block section map 30 does not necessarily include information of the boundary line 34.

FIG. 6 is a view illustrating an example of an individual block section map 40a (first individual block section map) for the unmanned forklift 2a.

In FIG. 6, the reference block section map 30 illustrated in FIG. 5 is also displayed for reference to be superimposed on the individual block section map 40a, but the reference block section map 30 is not included in the individual block section map 40a. An individual block section 4a (first block section) in the individual block section map 40a is secured in a region corresponding to the passage 54 (see FIG. 1) of the distribution warehouse 50. Further, each of the individual block sections 4a is defined in a form represented by a set of the reference block sections 3 of the reference block section map 30, and is configured using a quadrilateral (for example, a rectangle) whose size can be defined by two vertices. As long as the above conditions are satisfied, sizes (referred to as section sizes Sa (first section sizes)) of the individual block sections 4a are not necessarily uniform. In the illustrated example, all the individual block sections 4a are rectangles, and the section size Sa in the X direction×Y direction is 6×6, 6×5, or 6×8. Although not illustrated, the individual block section map 40a also includes information such as a position, the section size Sa, and a section state of each of the individual block sections 4a. Hereinafter, the section state in the individual block section map 40a is referred to as an "individual section state Da (first individual section state)".

In the illustrated example, the individual block sections 4a of two lanes are secured in a portion extending in the Y direction at the center of the individual block section map 40a so as to divide the X direction into two. As a result, when the unmanned forklifts 2a travel in the two lanes, respectively, section states can be prevented from interfering with each other, and the two unmanned forklifts 2a can travel side by side or pass each other. Further, in the individual block section map 40a, a block section ID for uniquely identifying each of the individual block sections 4a is stored, a travel node 5a (first travel node) having one-to-one correspondence with each of the individual block sections 4a is set, and a travel node ID for uniquely identifying each travel node is stored.

FIG. 7 is a view illustrating an example of the individual block section map 40b (second individual block section map) for the AMR 2b.

In FIG. 7, the reference block section map 30 illustrated in FIG. 5 is also displayed for reference to be superimposed on the individual block section map 40b, but the reference block section map 30 is not included in the individual block section map 40b. An individual block section 4b (second block section) in the individual block section map 40b is secured in a region corresponding to the passage 54 (see FIG. 1) of the distribution warehouse 50. Further, each of the individual block sections 4b is defined in a form represented by a set of the reference block sections 3 of the reference block section map 30, and is configured using a quadrilateral (for example, a rectangle) whose size (referred to as a section size Sb (second section size)) can be defined by two vertices. As long as the above conditions are satisfied, sizes of the individual block sections 4b are not necessarily uniform. In the illustrated example, all the individual block sections 4b are rectangles, and the section size Sb in the X direction×Y direction is 3×3, 4×3, 2×3, or 3×4. Although not illustrated, the individual block section map 40b also includes information such as a position, a size, and a section state of each of the individual block sections 4b. Hereinafter, the section state in the individual block section map 40b is referred to as an "individual section state Db (second individual section state)".

In the illustrated example, the individual block sections 4b of four lanes are secured in a portion extending in the Y direction at the center of the individual block section map 40b so as to divide the X direction into four. As a result, when the AMRs 2b travel in the four lanes, respectively, section states can be prevented from interfering with each other, and the four AMRs 2b can run in parallel or pass each other. Further, in the individual block section map 40b, a block section ID for uniquely identifying each of the individual block sections 4b is stored, a travel node 5b (second travel node) having one-to-one correspondence with each of the individual block sections 4b is set, and a travel node ID for uniquely identifying each travel node is stored.

Since the individual block section maps 40a and 40b are configured as described above, the travel node ID and the block section ID in each of the individual block section maps 40a and 40b can be easily interconverted. As a result, when block sections of the reference block section map 30 and the individual block section maps 40a and 40b are interconverted, the conversion is easily performed only with two indexes (two vertices of the quadrilateral). As a result, it is possible to reduce a processing load of the map converter 13 and the amount of information sent and received to and from the reference block section map DB14 via the reference map I/F 16.

Returning to FIG. 4, the block control controller 11 outputs a section state response request CD or a section state change request CC to the map converter 13. Here, the section state response request CD is a command for requesting a response of a section state of a designated blocked section. Further, the section state change request CC is a command for requesting a change of a section state of a designated blocked section.

When the section state response request CD is supplied from the block control controller 11, the map converter 13 reads the individual block section maps 40a and 40b from the individual block section map DB12, or reads the reference block section map 30 from the reference block section map DB14, and returns a section state that has been inquired. Further, when the section state change request CC is supplied from the block control controller 11, the map converter 13 interconverts the individual section states Da and Db and the reference section state Dc according to the content thereof.

In the example illustrated in FIG. 4, the individual block section map DB12 stores the individual block section maps 40a and 40b, and the reference block section map DB14 stores the reference block section map 30. However, both the reference block section map 30 and the individual block section maps 40a and 40b may be stored in one common database.

Figure 8:
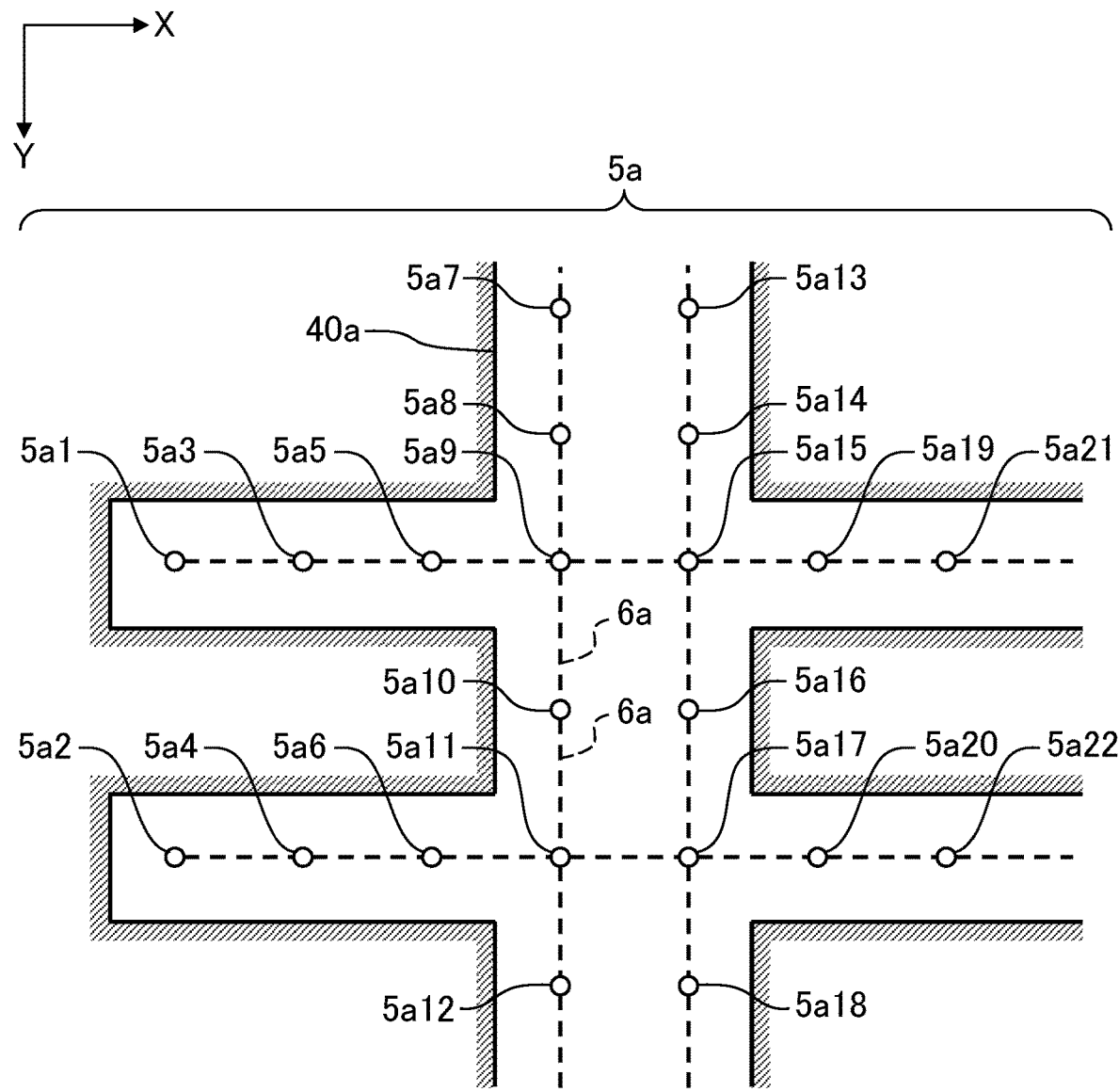
FIG. 8 is an explanatory view of travel nodes for an unmanned forklift.

FIG. 8 is an explanatory view of the travel nodes 5a for the unmanned forklift 2a.

In the example of FIG. 8, the 22 travel nodes 5a illustrated in FIG. 6 are distinguished as travel nodes 5a1 to 5a22. The unmanned forklift 2a moves between these travel nodes 5a following a route connected by a link 6a indicated by a broken line. The unmanned forklift 2a plans a global route in the own device. The global route is obtained by planning which travel node 5a is traced in which order to reach a destination from a current location. As described in FIG. 6, the individual block sections 4a of two lanes are secured in a wide passage extending in the Y direction in the individual block section map 40a so as to divide the X direction into two. Therefore, two rows of the links 6a are secured in such a portion as illustrated in FIG. 8. On the other hand, only one unmanned forklift 2a can pass through a narrow passage extending in the X direction, and thus, one row of the link 6a is secured.

Figure 9:
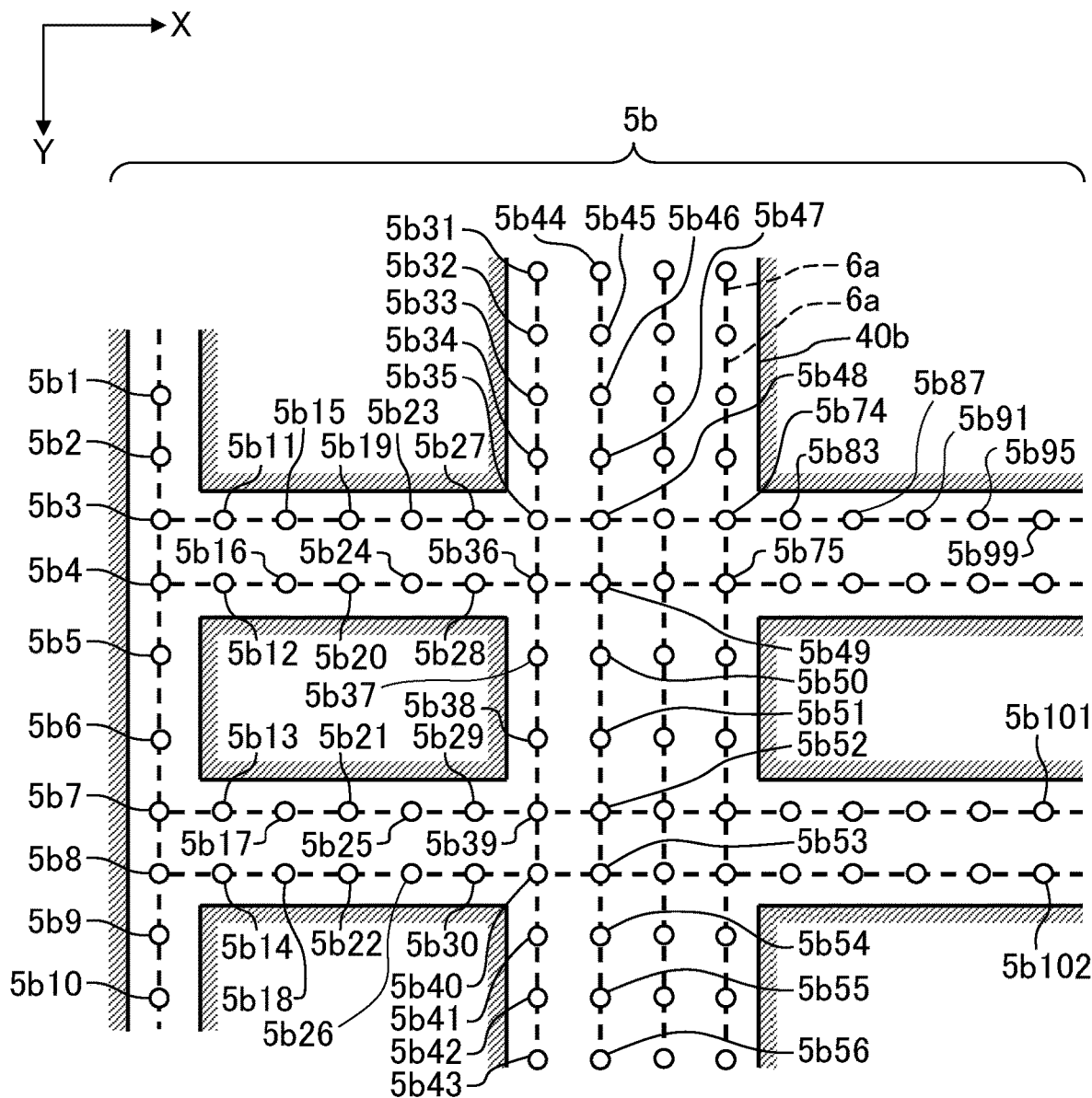
FIG. 9 is an explanatory view of travel nodes for an AMR.

FIG. 9 is an explanatory view of the travel nodes 5b for the AMR 2b.

In the example of FIG. 9, 102 travel nodes 5b illustrated in FIG. 7 are distinguished as travel nodes 5b1 to 5b102. In FIG. 7, only some of the travel nodes 5b1 to 5b102 are illustrated with reference signs. The AMR 2b moves between these travel nodes 5b following a route connected by a link 6b indicated by a broken line. The AMR 2b plans a global route similarly to the unmanned forklift 2a described above. As described in FIG. 7, the individual block sections 4b of four lanes are secured in a wide passage extending in the Y direction in the individual block section map 40b so as to divide the X direction into four. Therefore, four rows of the links 6b are secured in such a portion as illustrated in FIG. 9. On the other hand, two rows of the links 6b are secured since two AMRs 2b can pass through the passage extending in the X direction.

As illustrated in FIGS. 8 and 9, it is possible to set the travel nodes 5a and 5b different depending on a size, a type, a travel mode, and the like of the autonomous mobile devices 2 such as the unmanned forklift 2a and the AMR 2b according to the present embodiment. As described above, a unique travel node ID is assigned to each of the travel nodes 5a and 5b. The autonomous mobile device 2 and the operation management apparatus 1 transmit information such as a global route and a block section by sending and receiving the travel node IDs.

Although reference signs for distinguishing the individual block sections 4a and 4b are not illustrated in FIGS. 6 and 7, the individual block sections 4a corresponding to the travel node 5a1 to 5a22 (see FIG. 8) may be referred to as individual block sections 4a1 to 4a22 in the following description. Similarly, the individual block sections 4b corresponding to the travel nodes 5b1 to (see FIG. 9) may be referred to as individual block sections 4b1 to 4b102, respectively.

Specific Operations of First Embodiment

Next, specific operations of the present embodiment will be described.

Figure 10:
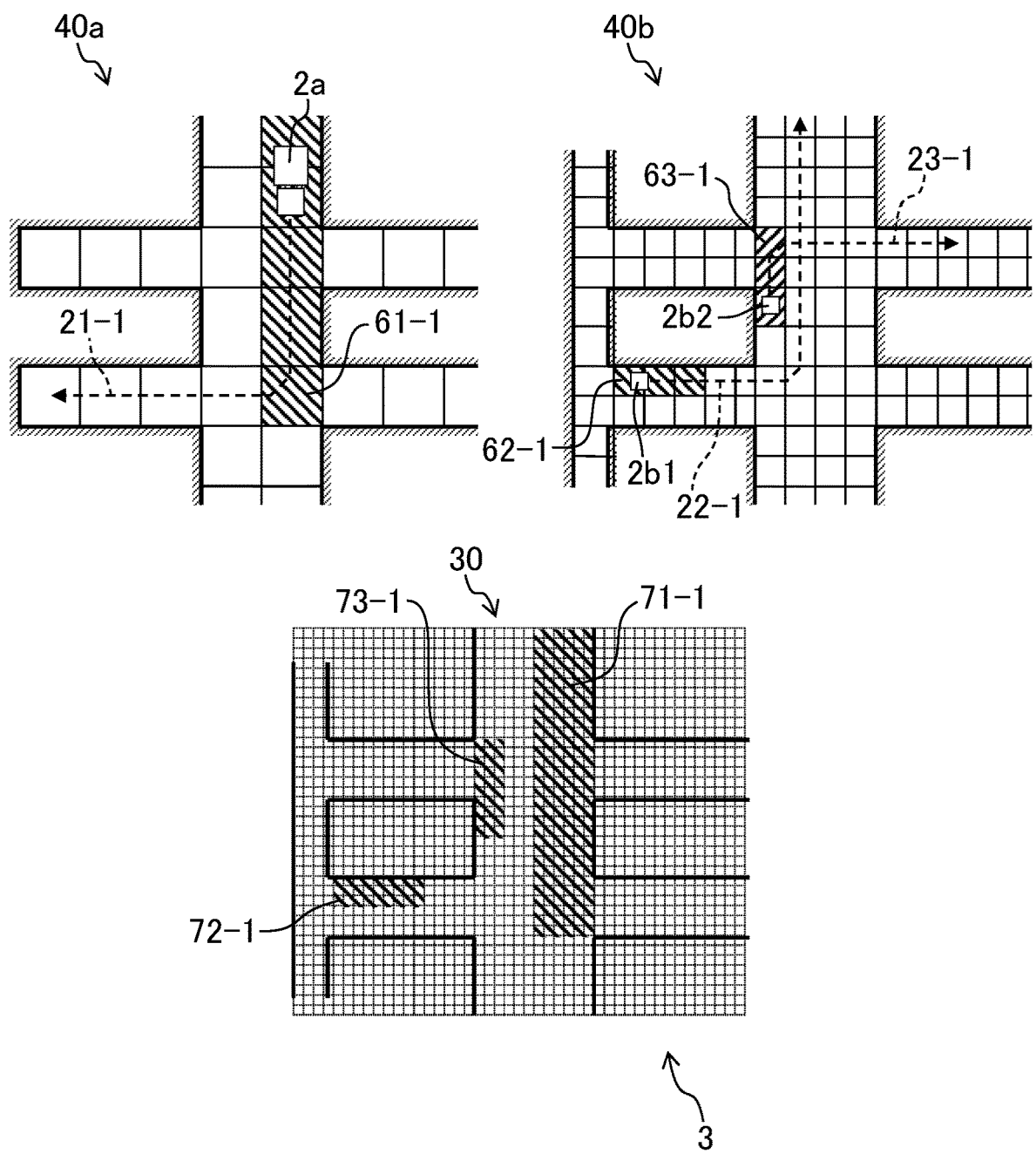
FIG. 10 is a view illustrating a state example of autonomous mobile devices at a certain time.

FIG. 10 is a view illustrating a state example of the autonomous mobile devices 2 at a certain time.

As illustrated in the individual block section map of FIG. 10, it is assumed that the unmanned forklift 2a plans a global route 21-1 indicated by a broken line. The global route 21-1 is a route tracing the travel nodes 5a13, 5a15, 5a16, 5a17, 5a11, 5a6, 5a4, and 5a2 in FIG. 8.

As illustrated in the individual block section map of FIG. 10, it is assumed that AMRs 2b1 and 2b2 plan global routes 22-1 and 23-1 indicated by broken lines, respectively. Note that the global route 22-1 corresponds to the travel nodes 5b13, 5b17, 5b21, 5b25, 5b29, 5b39, 5b51, 5b50, 5b49, 5b48, 5b47, 5b46, 5b45, and 5b44 in FIG. 9. The global route 23-1 corresponds to the travel nodes 5b37, 5b36, 5b35, 5b48, 5b61, 5b74, 5b83, 5b87, and in FIG. 9.

The unmanned forklift 2a and the AMRs 2b1 and 2b2 transmit travel node IDs of the travel nodes constituting the global routes 21-1, 22-1, and 23-1 and mobile object IDs of the unmanned forklift 2a and the AMRs 2b1 and 2b2 to the operation management apparatus 1. The operation management apparatus 1 first performs a section state response request process. In the block control controller 11, a closest travel node that is a travel node at a specific travel distance which can be reached within a predetermined time with respect to the travel nodes sent from the autonomous mobile device 2 is extracted.

The closest travel node extracted here is a travel node of a portion included in each of closest travel sections 61-1, 62-1, and 63-1 which are hatched regions among the travel nodes constituting the global routes 21-1, 22-1, and 23-1. That is, the extracted closest travel nodes in the global route 21-1 are the travel nodes 5a13, 5a14, 5a15, 5a16, and 5a17 in FIG. 8. Further, the extracted closest travel nodes in the global route 22-1 are the travel nodes 5b13, 5b17, and 5b21 in FIG. 9, and the extracted closest travel nodes in the global route 23-1 are the travel nodes 5b37, 5b36, and 5b35 in FIG. 9.

The block control controller 11 converts the closest travel nodes extracted as above into corresponding closest travel sections. That is, in the global route 21-1, a section corresponding to the extracted closest travel nodes is the closest travel section 61-1, and more specifically, is the individual block sections 4a13 to 4a17 (corresponding to the travel nodes 5*a*13 to 5*a*17 in FIG. 8). In the global route 22-1, a section corresponding to the extracted closest travel nodes is the closest travel section 62-1, and more specifically, the individual block sections 4*b*13, 4*b*17, and 4*b*21 (corresponding to the travel nodes 5*b*13, 5*b*17, and 5*b*21 in FIG. 9).

In the global route 23-1, a section corresponding to the extracted closest travel nodes is the closest travel section 63-1, and more specifically, the individual block sections 4*b*37, 4*b*36, and 4*b*35 (corresponding to the travel nodes 5*b*37, 5*b*36, and 5*b*35 in FIG. 9). The block control controller 11 supplies the section state response request CD for requesting the individual block sections 4*a* and 4*b* corresponding to the closest travel nodes to the map converter 13. Then, the map converter 13 converts the supplied individual block sections 4*a* and 4*b* into the reference block section 3 (see FIG. 5) in the reference block section map 30.

In the example of FIG. 10, the map converter 13 converts the closest travel sections 61-1, 62-1, and 63-1 in the individual block section maps 40*a* and 40*b* into reference closest travel sections 71-1, 72-1, and 73-1 which are hatched sections in the reference block section map 30, respectively. Here, ranges of the reference closest travel sections 71-1, 72-1, and 73-1 will be described in more detail using coordinates illustrated in FIG. 5.

First, the reference closest travel section 71-1 for the unmanned forklift 2*a* is within a rectangular range having reference block sections X25Y1 and X30Y31 as vertices in the coordinates illustrated in FIG. 5. Further, the reference closest travel section 72-1 for the AMR 2*b*1 is within a rectangular range with reference block sections X5Y26 and X13Y28 as vertices. Further, the reference closest travel section 73-1 for the AMR 2*b*2 is within a rectangular range with reference block sections X19Y12 and X21Y21 as vertices.

As described above, when the reference block sections for the reference closest travel sections 71-1, 72-1, and 73-1 are obtained, the map converter 13 inquires of the reference block section map DB14 about the reference section state Dc of each of the reference block sections. Here, it is assumed that all the reference block sections 3 are not allocated to any of the autonomous mobile devices 2 in an initial state.

Then, the reference block section map DB14 returns "0" (non-blocked) to the map converter 13 as the reference section states Dc of all the inquired reference block sections 3. The map converter 13 returns "0" (non-blocked) to the block control controller 11 as the section states of the individual block sections 4*a* and 4*b*, and the section state response request process is completed.

Subsequently, the block control controller 11 performs a block request process. Since the section states of the individual block sections 4*a* and 4*b* obtained based on the section state response request CD are all "0" (non-blocked), the block control controller 11 transmits the section state change request CC including all the individual block sections 4*a* and 4*b* included in the closest travel sections 61-1, 62-1, and 63-1 as targets of a block request to the map converter 13.

In the map converter 13, the individual block sections 4*a* and 4*b* included in the section state change request CC are converted into the reference block section 3, the reference block section map DB14 is requested to register each of the mobile object IDs, and the reference section state Dc of each of the reference block sections 3 is updated in the reference block section map DB14. The reference block section map 30 with the updated reference section state Dc is as illustrated in FIG. 10.

Figure 11:
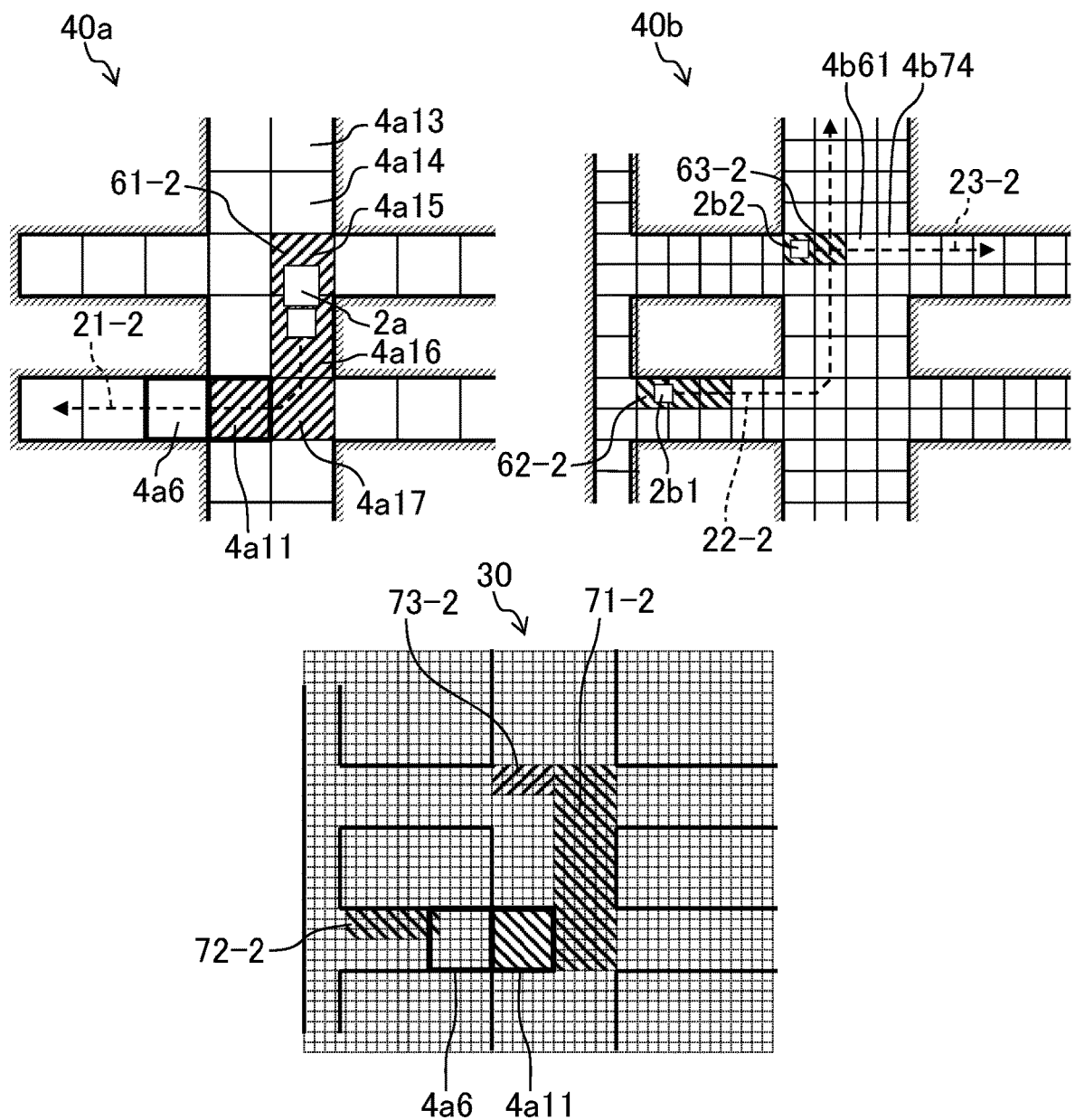
FIG. 11 is a view illustrating a state example of the autonomous mobile devices at another time.

FIG. 11 is a view illustrating a state example of the autonomous mobile devices 2 at another time. That is, FIG. 11 illustrates a state in which a certain time has elapsed from the state illustrated in FIG. 10 and the unmanned forklift 2*a* and the AMR 2*b*2 have slightly moved along the global routes 21-1 and 23-1, respectively. However, the AMR 2*b*1 stops for some reason and remains at the same position as the position illustrated in FIG. 10, and a global route 22-2 in FIG. 11 is the same as the global route 22-1 in FIG. 10. In the state of FIG. 11, the unmanned forklift 2*a* has already passed through the individual block sections 4*a*13 and 4*a*14 as a result of traveling from the state of FIG. 10.

In this manner, the remaining portion of the allocated closest travel section 61-1 (see FIG. 10) has been narrowed, the unmanned forklift 2*a* makes a block request accompanied by a global route 21-2 to the operation management apparatus 1. Here, the global route 21-2 is obtained by excluding a section that has already passed through from the global route 21 (see FIG. 10), and is a route tracing the travel nodes 5*a*15, 5*a*16, 5*a*17, 5*a*11, 5*a*6, 5*a*4, and 5*a*2 in FIG. 8.

The operation management apparatus 1 extracts a closest travel node that is a travel node at a specific travel distance which can be reached within a predetermined time with respect to the received global route 21-2. That is, the travel nodes 5*a*15, 5*a*16, 5*a*17, 5*a*11, and 5*a*6 in FIG. 8 are the extracted travel nodes. These travel nodes correspond to the individual block sections 4*a*15, 4*a*16, 4*a*17, 4*a*11, and 4*a*6 in FIG. 11.

The block control controller 11 converts the closest travel nodes extracted as above into corresponding closest travel sections. That is, sections of the global route 21-2 corresponding to the extracted closest travel nodes are the individual block sections 4*a*15, 4*a*16, 4*a*17, 4*a*11, and 4*a*6. Here, when being converted into a reference block section, the individual block section 4*a*6 is within a rectangular range having reference block sections X13Y26 and X18Y31 as vertices in FIG. 5. However, a value of the mobile object ID of the AMR 2*b*1 is set in the section states of the reference block sections X13Y26, X13Y27, and X13Y28 (0 is set in section states of the other reference block sections). In the present embodiment, when even a part of an individual block section is blocked, it is considered that the entire individual block section is blocked. Thus, the individual block section 4*a*6 has the section state set to the value of the mobile object ID of the AMR 2*b*1, and is not allocable to the unmanned forklift 2*a*.

Therefore, the block control controller 11 performs the block request process for the individual block sections 4*a*15, 4*a*16, 4*a*17, and 4*a*11 whose section state is the mobile object ID of the unmanned forklift 2*a* or 0. In other words, the block control controller 11 performs the block request process for a hatched closest travel section 61-2. As a result of the block request process, the block control controller 11 cancels blocking for the individual block sections 4*a*13 and 4*a*14 which are sections not included in the current block request (sections through which the unmanned forklift 2*a* has already passed).

Then, the block control controller 11 converts the sections of the closest travel section 61-2 allocated to the unmanned forklift 2*a*, that is, the individual block sections 4*a*15, 4*a*16, 4*a*17, and 4*a*11 into the travel nodes 5*a*15, 5*a*16, 5*a*17, and 5*a*11, and returns these travel node IDs to the unmanned forklift 2*a*. In the reference block section map 30, the reference block section 3 included in a reference closest travel section 71-2 is blocked with respect to the unmanned forklift 2*a*.

In this manner, it is considered that the entire individual block section is blocked when the corresponding reference block section is partially blocked with respect to the individual block section in the present embodiment, so that the risk of the collision between the autonomous mobile devices 2 can be further reduced. Similarly, the AMR 2b2 transmits a global route 23-2 illustrated in the individual block section map 40b to the operation management apparatus 1, and makes a block request to the operation management apparatus 1. On the other hand, the AMR 2b1 does not particularly make a new block request since the global route 22-2 of the AMR 2b1 is the same as the global route 22-1 (see FIG. 10). Note that the global route 23-2 is obtained by excluding a section which has been already passed through from the global route 23-1 (see FIG. 10), and is a route tracing the travel nodes 5b35, 5b48, 5b61, 5b74, 5b83, and 5b91 in FIG. 9.

However, the reference block section 3 corresponding to the travel nodes 5b61 and 5b74 is a part of the reference closest travel section 71-2 and is already blocked with respect to the unmanned forklift 2a. Therefore, the block control controller 11 blocks, with respect to the AMR 2b2, a section corresponding to the travel nodes 5b35 and 5b48 immediately before the reference closest travel section 71-2, that is, the individual block sections 4b35 and 4b48. Then, the block control controller 11 releases blocks of the individual block sections 4b37 and 4b36 that are not included in the global route 23-2 (through which the AMR 2b2 has already passed).

The reference block section map 30 with the updated section state is as illustrated in FIG. 11. That is, as compared with FIG. 10, the reference closest travel section 71-1 for the unmanned forklift 2a is changed to 71-2, and the reference closest travel section 73-1 for the AMR 2b2 is changed to 73-2. However, a reference closest travel section 72-2 for the AMR 2b1 is the same as the reference closest travel section 72-1 illustrated in FIG. 10.

Figure 12:
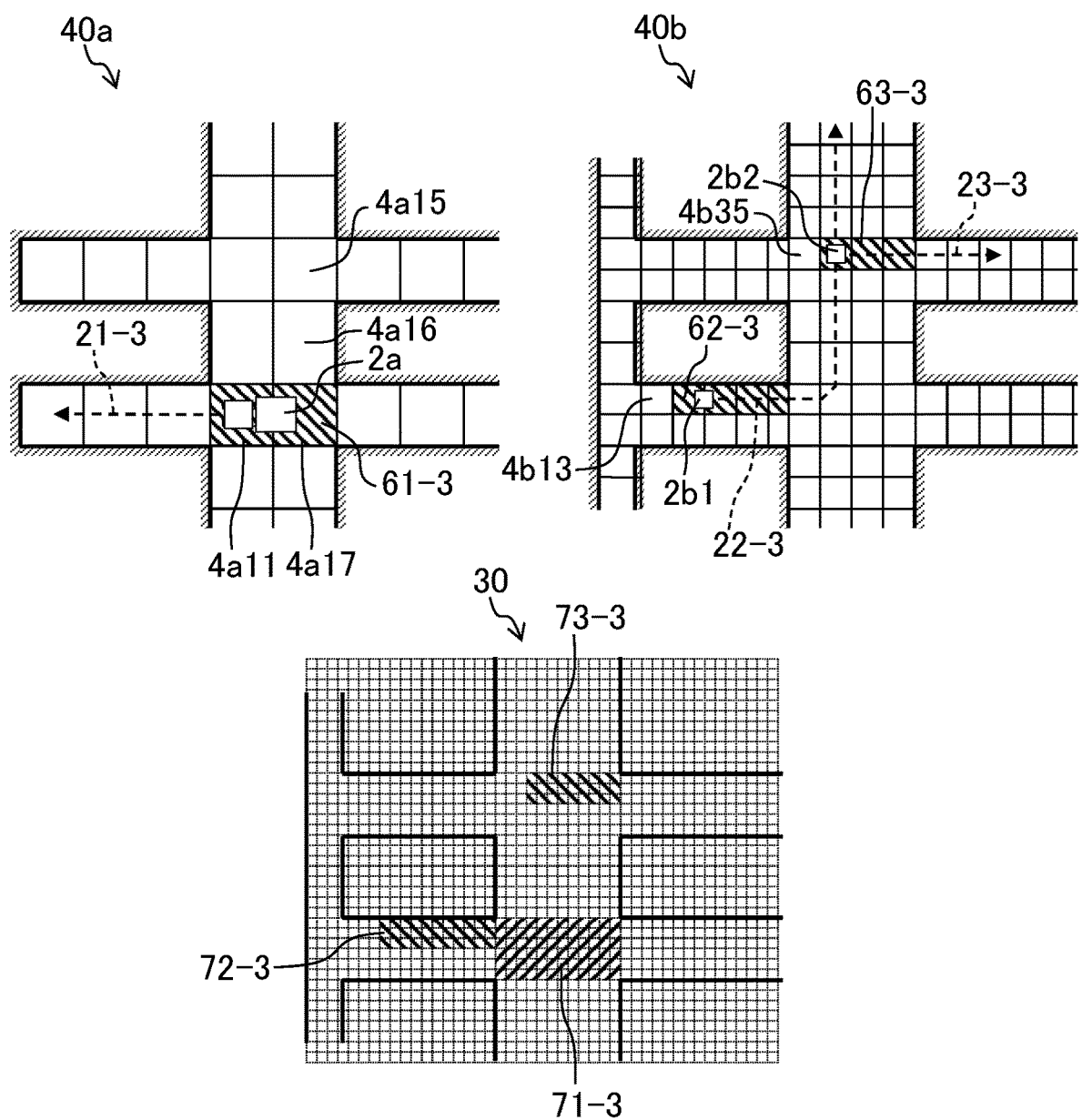
FIG. 12 is a view illustrating a state example of the autonomous mobile devices at still another time.

FIG. 12 is a view illustrating a state example of the autonomous mobile devices 2 at still another time. That is, FIG. 12 illustrates a state in which a certain time has elapsed from the state illustrated in FIG. 11 and the unmanned forklift 2a and the AMRs 2b1 and 2b2 have slightly moved along the global routes 21-2, 22-2, and 23-2, respectively. As for the unmanned forklift 2a, the individual block sections 4a15 and 4a16 is unblocked, and a closest travel section 61-3 which is a hatched region, that is, the individual block sections 4a11 and 4a17 are blocked as compared with the state illustrated in FIG. 11. As for the AMR 2b1, the individual block section 4b13 is unblocked from the state of FIG. 11, and a closest travel section 62-3 which is a hatched region, that is, the individual block sections 4b17, 4b21, 4b25, and 4b29 are blocked.

As for the AMR 2b2, the individual block section 4b35 is unblocked from the state of FIG. 11. Further, since the unmanned forklift 2a moves and the reference block sections corresponding to the individual block sections 4b61 and 4b74 are unblocked, a closest travel section 63-3 which is a hatched region, that is, the individual block sections 4b48, 4b61, and 4b74 are blocked. Reference closest travel sections 71-3, 72-3, and 73-3 in the reference block section map 30 of which the section states have been updated as described above are as illustrated in FIG. 12.

General Operation of First Embodiment

Next, a general operation of the present embodiment that implements the above-described specific operations will be described.

First, the respective autonomous mobile devices 2 plan global routes to destinations. Examples of these are the global routes 21-1, 22-1, and 23-1 illustrated in FIG. 10. However, the destination for each of the autonomous mobile devices 2 may be manually set by a user, or may be issued from any server computer (not illustrated). After planning the global route, the autonomous mobile device 2 needs to implement blocking of an area to move for the own device in order to travel along the global route. This is because each of the autonomous mobile devices 2 can move only in the individual block sections 4a and 4b that are blocked for the own device.

Therefore, each of the autonomous mobile devices 2 transmits the block requests Ra and Rb (see FIG. 4) including a list of the travel node IDs of the travel nodes 5a and 5b constituting the global route and the mobile object ID of the own device to the operation management apparatus 1. In the operation management apparatus 1, the block control controller 11 receives the list of the travel node IDs and the mobile object ID.

Next, in the operation management apparatus 1, the block control controller 11 extracts travel nodes from a current location to a position to which the autonomous mobile device 2 can move within a present period from the list of the travel nodes on the global route (travel node list) sent from the autonomous mobile device 2. For example, the block control controller 11 extracts the travel nodes included in the closest travel sections 61-1, 62-1, and 63-1 in FIG. 10.

A range of the travel node to be extracted may be a travel node within a range that can be reached in a predetermined time, a travel node within a predetermined movement distance, or the like. It is conceivable to calculate a distance that can be reached in a predetermined time, for example, by setting a maximum permitted speed at the time of traveling a corresponding place for each of the travel nodes or a link between the travel nodes and using the speed and a distance between the travel nodes. Further, it is conceivable that the autonomous mobile device 2 transmits a speed planned in autonomous traveling control of the autonomous mobile device 2 to the operation management apparatus 1 simultaneously with the global route, and a distance that can be reached in a predetermined time is calculated using the transmitted speed and a distance between the travel nodes.

The block control controller 11 converts the extracted travel node IDs into a corresponding individual block section ID using information of the individual block section maps 40a and 40b associated with the mobile object ID read from the individual block section map DB12. As a result, it is possible to select an individual block section that is a target of the section state response request CD. The one or plurality of individual block sections 4a and 4b are sent to the map converter 13 together with the mobile object ID as the section state response request CD.

The map converter 13 reads the information of the individual block section maps 40a and 40b associated with the mobile object ID, and obtains positions and sizes of the target individual block sections 4a and 4b from the information of the map. Further, the map converter 13 reads information of the reference block section map 30 from the reference block section map DB14 to obtain a position and a size of the reference block section 3. The map converter 13 extracts the reference block section 3 whose position partially overlaps based on the position and size information of the individual block sections 4a and 4b corresponding to the target autonomous mobile device 2, and lists the reference block sections 3 corresponding to the individual block sections 4a and 4b. In this manner, the map converter 13 can perform the conversion from the individual block sections 4a and 4b to the reference block section 3.

The map converter 13 reads the reference section states Dc of the one or plurality of reference block sections 3 converted from the reference block section map DB, converts the reference section state Dc into the individual section states Da and Db, and returns the individual section states Da and Db to the block control controller 11. At that time, if even one of the plurality of reference section states Dc corresponding to any of the individual section states Da and Db is blocked (if the section state is 1 or more), the map converter 13 considers that the entire individual section states Da and Db are blocked. That is, if at least one of the reference section states Dc has a value other than 0, the individual section states Da and Db may be set to the value. Further, for example, the maximum value among the reference section states Dc may be set to the values of the individual section states Da and Db.

The block control controller 11 confirms the contents of the individual section states Da and Db based on a response to the section state response request CD, and determines whether or not the individual block sections 4a and 4b are blocked by the other autonomous mobile devices 2. When the individual block sections 4a and 4b are not blocked by the other autonomous mobile devices 2, the block control controller 11 performs a block process of allocating the individual block sections 4a and 4b to the target autonomous mobile device 2.

The allocation (block request) of a block section is performed as follows, for example. The block control controller 11 transmits the individual block sections 4a and 4b, which are targets of the block request, and the mobile object ID to the map converter 13 as the section state change request CC. At that time, the block control controller 11 extracts the individual block sections 4a and 4b, which are the targets of the block request, based on the individual section states Da and Db of the individual block sections 4a and 4b obtained by a response to the section state response request CD. Specifically, when the individual block sections 4a and 4b are arranged in order from a side closer to the current location of the autonomous mobile device 2, the block control controller 11 sets the individual block sections 4a and 4b immediately before the individual block sections 4a and 4b whose section state is other than the mobile object ID of the own device as the targets of the block request.

When receiving the section state change request CC, the map converter 13 converts each of the individual block sections 4a and 4b into the reference block section 3 similarly to the processing for the section state response request CD. The map converter 13 outputs a command to the reference block section map DB14 to set, for example, a mobile object ID as the reference section state Dc for the one or plurality of converted reference block sections 3. Further, the reference block section 3 in which the mobile object ID as the target of the block request is set is searched for other than the reference block section 3 for which the block request has been made, and the reference section state Dc thereof is reset to "0". As a result, a position of the autonomous mobile device 2 proceeds with time, and the reference block section 3 that has already traveled can be automatically opened.

The reference block section map DB14 rewrites a section state of the reference block section as sent from the map converter 13. Thereafter, the map converter 13 acquires the reference section state Dc of the reference block section 3, converts the result into the individual section states Da and Db, and returns the individual section states Da and Db to the block control controller 11 as the response to the section state change request CC, which is similar to the processing for the section state response request CD.

Second Embodiment

Next, a second embodiment will be described. Note that parts corresponding to the respective units of the first embodiment described above will be denoted by the same reference signs in the following description, and descriptions thereof will be omitted in some cases. Configurations and operations of the present embodiment are similar to those of the first embodiment (see FIGS. 1 to 12) except for the following points.

In the state illustrated in FIG. 12 of the first embodiment described above, directions in which the unmanned forklift 2a and the AMR 2b1 proceed with each other are blocked, and a deadlock state in which further proceeding is not possible. The present embodiment is characterized in that individual block sections are grouped in order to suppress such a state.

Figure 13:
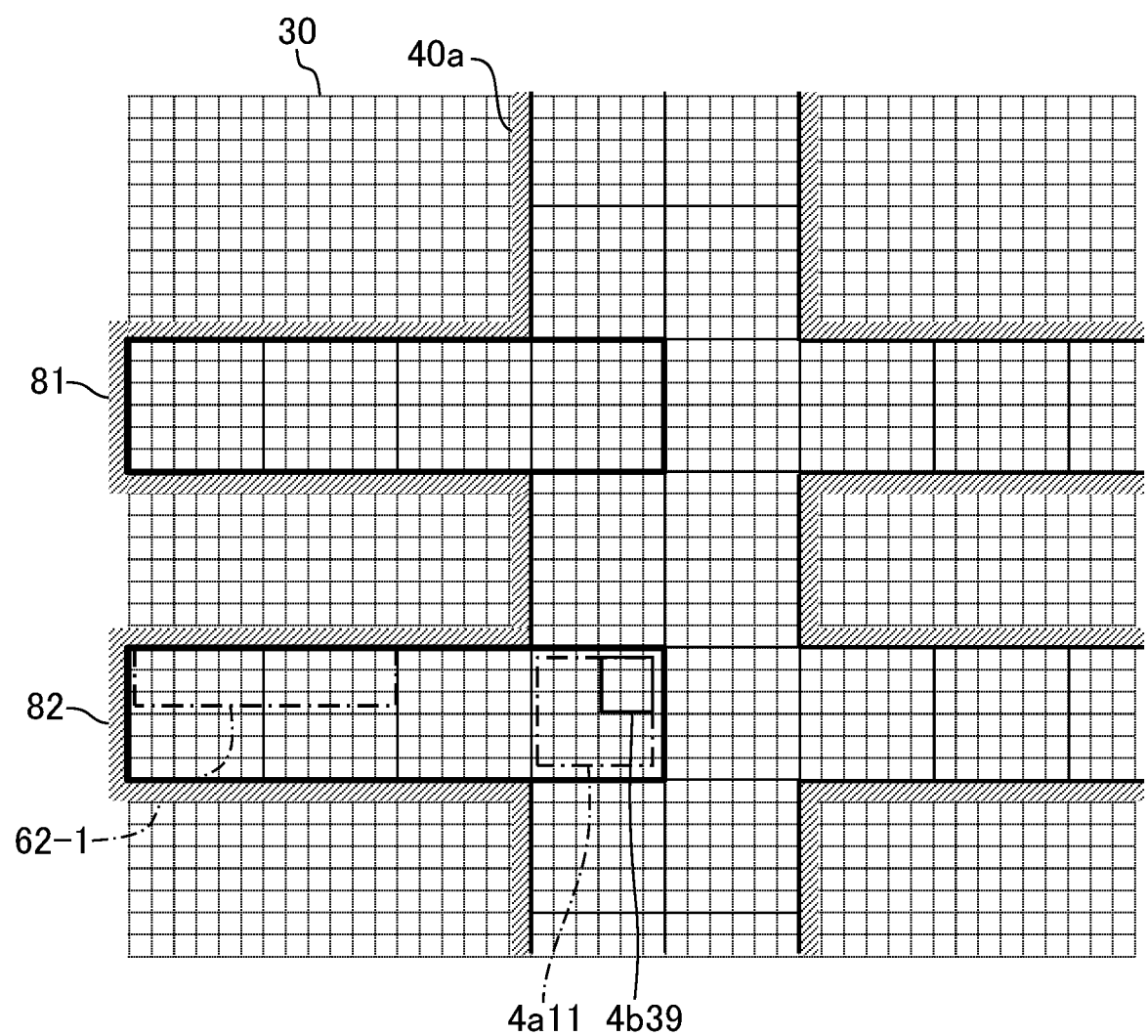
FIG. 13 is a view illustrating an example of an individual block section group in a second embodiment.

FIG. 13 is a view illustrating an example of an individual block section group in the second embodiment. Individual block section groups 81 and 82 illustrated in FIG. 12 are set in the individual block section map 40a, and each of the individual block section groups includes a plurality of individual block sections. Each of the individual block section groups 81 and 82 is used in the same manner as one individual block section in the operation management apparatus 1. That is, when any part of a reference block section is blocked in the individual block section group 81 or 82, the block control controller 11 blocks the entire individual block section group 81 or 82.

The closest travel section 62-1 illustrated in FIG. 13 has the same range as that illustrated in FIG. 10. When the block control controller 11 blocks the closest travel section 62-1 with respect to the AMR 2b1 (see FIG. 12), the block control controller 11 further blocks the entire range of the individual block section group 82 with respect to the AMR 2b1. Note that the individual block section group 82 is a rectangular range having reference block sections X5Y26 and X24Y31 as vertices in FIG. 5. As a result, it becomes difficult for the unmanned forklift 2a to block the individual block section 4a11.

As a result, the AMR 2b1 can travel to the individual block section 4b39. Then, after the individual block sections (4b13, 4b17, 4b21, 4b25, 4b29, and 4b39) in the individual block section group 82 are unblocked with respect to the AMR 2b1, the unmanned forklift 2a can block the individual block sections (4a11, 4a6, 4a4, and 4a2) in the individual block section group 82, and the both can travel to destinations. When the individual block section groups are used in this manner, it is possible to avoid a deadlock state.

In the example illustrated in FIG. 13, the individual block section groups 81 and 82 are set for the individual block section map 40a, but the individual block section groups can be similarly set for other individual block section maps such as the individual block section map 40b (see FIG. 7).

Effects of Embodiments

As described above, according to the above-described embodiments, the operation management apparatus 1 includes: the map converter 13 that performs interconversion between the first individual section state (Da) corresponding to the first mobile object (2a) and the reference section state Dc, and interconversion between the second individual section state (Db) corresponding to the second mobile object (2b) and the reference section state Dc; and the block control controller 11 that determines the first individual section state (Da) and the second individual section state (Db) based on conversion results of the map converter 13 so as to prevent a collision between the first mobile object (2a) and the second mobile object (2b).

The operation management apparatus 1 can autonomously travel in an environment where the mobile objects (2a and 2b) having different sizes are mixed while preventing the collision between these mobile objects, and can appropriately control a plurality of types of mobile objects having different sizes. Further, the individual block sections 4a and 4b in the first and second individual block section maps (40a and 40b) and the reference block section 3 in the reference block section map 30 are interconverted by the map converter 13 according to the above-described embodiments. As a result, it is possible to reduce production costs for adding a new mobile object as compared with a case of using only one type of individual block section map (for example, only the individual block section map 40a).

If only one type of individual block section map is used, it is necessary to have correspondence relations of which block sections among maps correspond to each other for all the maps. Therefore, for example, when a new mobile object is added during the operation of ten types of mobile objects (in a state where there are ten types of block section maps), it is necessary to describe correspondence relations with the ten types of block section maps in a new block section map. Further, it is necessary to add the correspondence relation with the new block section map to each of the existing ten types of block section maps. According to the above-described embodiments, it is sufficient to describe a correspondence relation with the reference block section map in a new individual block section map when a new mobile object is added, and thus, it is unnecessary to change the existing individual block section map.

Further, it is also conceivable to use only the reference block section map 30 without using the individual block section maps (40a and 40b). As compared with this configuration, the above-described embodiments can suppress a processing load of the block control and the amount of communication with a database. In the reference block section map 30, it is necessary to apply the section size Sa which is such fine that can express the individual block sections of all the mobile objects. Therefore, an enormous amount of communication is required to inquire about the individual reference section states Dc of the reference block section 3 and confirm whether or not the reference block section 3 is blocked. According to the above-described embodiments, if it has been found that even one reference block section 3 corresponding to certain individual block section 4a or 4b is blocked, it is unnecessary to confirm the reference section states Dc of the other reference block sections 3, and thus, the amount of communication can be greatly reduced.

Further, it is more preferable that the operation management apparatus 1 further include the database interface units (15 and 16) that input and output the first individual section state, the second individual section state, and the reference section state to and from the map databases (12 and 14). As a result, the map databases (12 and 14) can be placed at positions away from the operation management apparatus 1, and the degree of freedom with respect to installation places of the map databases (12 and 14) can be increased.

Further, it is more preferable that the operation management apparatus 1 further include the block control input/output interface (17) that has a function of receiving the first block request (Ra) for requesting blocking of any of the first block sections (4a) from the first mobile object (2a), a function of receiving the second block request (Rb) requesting blocking of any of the second block sections (4b) from the second mobile object (2b), a function of notifying the first mobile object (2a) of the determined first individual section state (Da), and a function of notifying the second mobile object (2b) of the determined second individual section state (Db). As a result, communication with respect to various mobile objects can be handled in a unified manner.

Further, it is more preferable that the block control controller 11 have a function of creating the first individual section state (Da) considering that the first block section (4a) is blocked with respect to the second mobile object (2b) when a part of the plurality of reference block sections 3 corresponding to any of the first block sections (4a) is blocked with respect to the second mobile object (2b), and a function of creating the second individual section state (Db) considering that the second block section (4b) is blocked with respect to the first mobile object (2a) when a part of the plurality of reference block sections 3 corresponding to any of the second block sections (4b) is blocked by the first mobile object (2a). As a result, the first individual section state (Da) and the second individual section state (Db) can be appropriately set based on the reference section states Dc of the reference block sections 3.

It is more preferable that all of the first block sections (4a) and all of the second block sections (4b) be rectangles. As a result, the first block sections (4a) and the second block section s(4b) can be arranged without gaps.

It is more preferable that all of the first block sections (4a) and all of the second block sections (4b) be sets of the reference block sections 3. As a result, the interconversion between the reference section state Dc and the individual section states Da and Db can be implemented with a small amount of computation.

Further, as in the second embodiment, it is more preferable that some of the first block sections (4a) belong to the individual block section group 81 and that the block control controller 11 further have a function of blocking all the first block sections (4a) belonging to the individual block section group 81 with respect to the first mobile object (2a) when any of the first block sections (4a) belonging to the individual block section group 81 is blocked with respect to the first mobile object (2a). As a result, it is possible to suppress the possibility of occurrence of the deadlock state.

Further, it is more preferable that a movement route of the first mobile object (2a) be defined by connecting a plurality of the first travel nodes (5a), the first travel nodes (5a) being associated with the first block sections (4a) on a one-to-one basis and that a movement route of the second mobile object (2b) be defined by connecting a plurality of the second travel nodes (5b), the second travel node (5b) being associated with the second block sections (4b) on a one-to-one basis. As a result, the correspondence relation between the first travel node (5a) and the first block section (4a) and the correspondence relation between the second travel node (5b) and the second block section (4b) can be simplified, and the amount of computation accompanying the conversion therebetween can be reduced.

Modifications

The invention is not limited to the above-described embodiments, and can include various modifications. The above-described embodiments have been exemplified in order to describe the invention in an easily understandable manner, and are not necessarily limited to one including the entire configuration that has been described above. Further, configurations of another embodiment can be substituted for some configurations of a certain embodiment, and a configuration of another embodiment can be added to a configuration of a certain embodiment. Further, deletion, or addition or substitution of other configurations can be made with respect to some configurations of each embodiment. Further, only a control line and an information line illustrated in the drawings considered to be necessary for the description have been illustrated, and all control lines and information lines required for a product are not illustrated. It may be considered that most of the configurations are practically connected to each other. Modifications that can be made to the above-described embodiments are, for example, as follows.

(1) Since hardware of the operation management apparatus 1 in the above-described embodiments can be implemented by a general computer, a program or the like for executing the above-described various processes may be stored in a storage medium (computer-readable recording medium in which the program is recorded) or distributed via a transmission path.

(2) Each of the above-described processes has been described as software processing that uses a program in the above-described embodiments, but a part or all of the processes may be replaced with hardware processing using an application specific integrated circuit (ASIC; Application-Specific IC), a field programmable gate array (FPGA), or the like.

(3) The various processes executed in the above-described embodiments may be executed by a server computer via a network (not illustrated), and the individual block section map DB12 and the reference block section map DB14 in the above-described embodiments may also be stored in the server computer.

What is claimed is:

1. An operation management apparatus comprising:
a map converter configured to perform interconversion between a first individual section state and a reference section state and interconversion between a second individual section state and the reference section state with respect to a map database including a first individual block section map, a second individual block section map, and a reference block section map, the first individual block section map storing the first individual section state that is either "blocked" indicating occupancy by or "non-blocked" indicating non-occupancy by a first mobile object or a second mobile object for each of first block sections having a first section size corresponding to the first mobile object, the second individual block section map storing the second individual section state that is either "blocked" indicating occupancy by or "non-blocked" indicating non-occupancy by the first or second mobile object for each of second block sections corresponding to the second mobile object and having a second section size different from the first section size, and the reference block section map storing the reference section state that is either "blocked" indicating occupancy by or "non-blocked" indicating non-occupancy by the first or second mobile object for each of reference block sections having a reference section size in which both the first and second individual block section maps can be represented; and a blocking control controller configured to determine the first individual section state and the second individual section state based on conversion results of the map converter to prevent a collision between the first mobile object and the second mobile object.

2. The operation management apparatus according to claim 1, further comprising
a database interface unit configured to input and output the first individual section state, the second individual section state, and the reference section state to and from the map database.

3. The operation management apparatus according to claim 1, further comprising
a block control input/output interface having:
a function of receiving a first block request for requesting blocking of any of the first block sections from the first mobile object;
a function of receiving a second block request for requesting blocking of any of the second block sections from the second mobile object;
a function of notifying the first mobile object of the determined first individual section state; and
a function of notifying the second mobile object of the determined second individual section state.

4. The operation management apparatus according to claim 1, wherein
the block control controller has:
when a part of a plurality of the reference block sections corresponding to any of the first block sections is blocked with respect to the second mobile object, a function of creating the first individual section state considering that the first block section is blocked with respect to the second mobile object; and
when a part of a plurality of the reference block sections corresponding to any of the second block sections is blocked with respect to the first mobile object, a function of creating the second individual section state considering that the second block section is blocked with respect to the first mobile object.

5. The operation management apparatus according to claim 1, wherein
all of the first block sections and all of the second block sections are rectangles.

6. The operation management apparatus according to claim 1, wherein
all of the first block sections and all of the second block sections are sets of a plurality of the reference block sections.

7. The operation management apparatus according to claim 1, wherein
some of the first block sections belong to an individual block section group, and
the block control controller further has a function of blocking all the first block sections belonging to the individual block section group with respect to the first mobile object when any of the first block sections belonging to the individual block section group is blocked with respect to the first mobile object.

8. The operation management apparatus according to claim 1, wherein
a movement route of the first mobile object is defined by connecting a plurality of first travel nodes, the first travel nodes being associated with the first block sections on a one-to-one basis, and
a movement route of the second mobile object is defined by connecting a plurality of second travel nodes, the second travel nodes being associated with the second block sections on a one-to-one basis.

* * * * *